F. R. WILLSON.
SPRING WHEEL.
APPLICATION FILED JULY 6, 1915.
1,159,309. Patented Nov. 2, 1915.
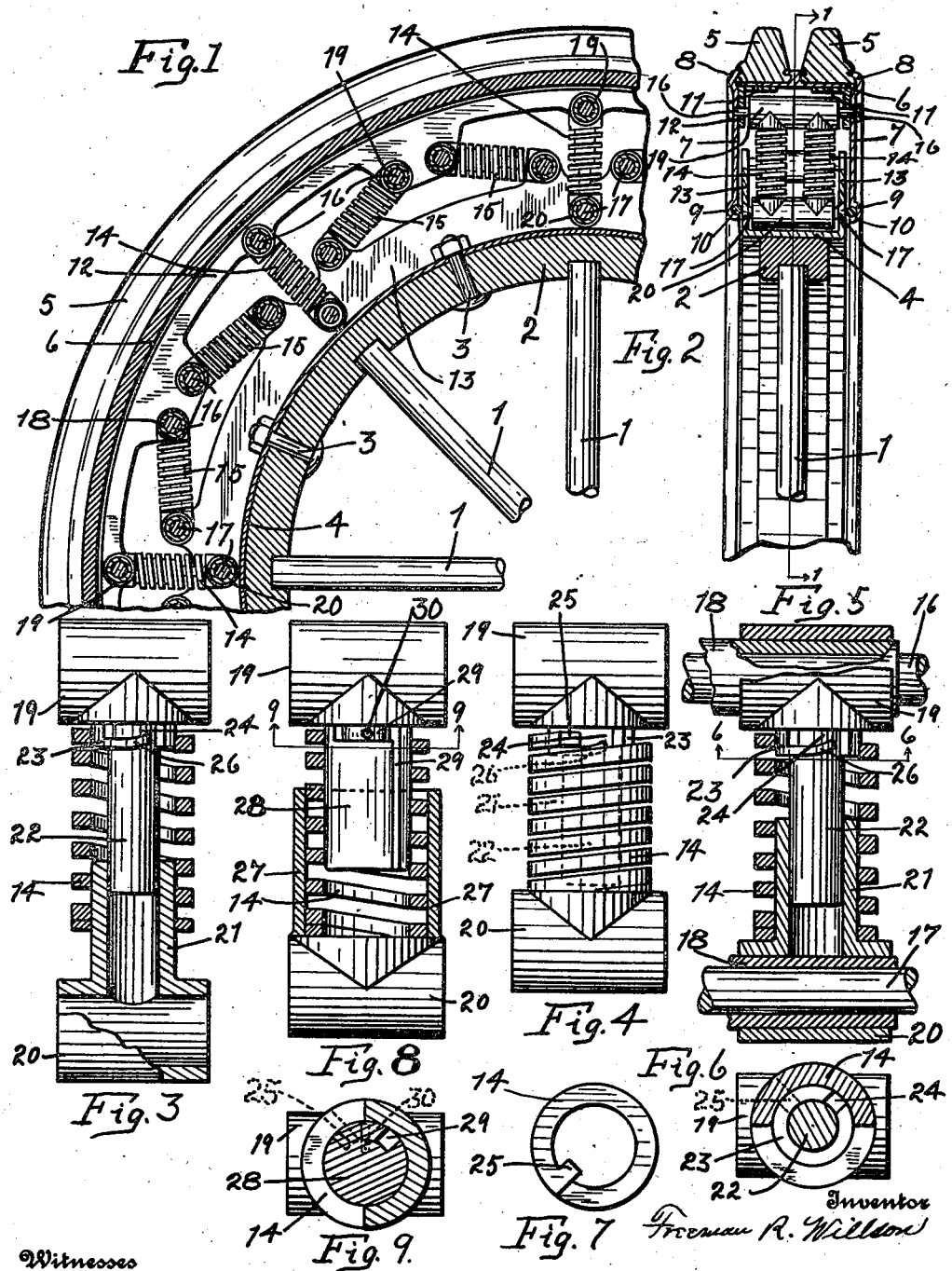

UNITED STATES PATENT OFFICE.

FREEMAN R. WILLSON, OF WORTHINGTON, OHIO.

SPRING-WHEEL.

1,159,309.     Specification of Letters Patent.     Patented Nov. 2, 1915.

Application filed July 6, 1915. Serial No. 38,052.

*To all whom it may concern:*

Be it known that I, FREEMAN R. WILLSON, a citizen of the United States, residing at Worthington, in the county of Franklin and State of Ohio, have invented certain new and useful Improvements in Spring-Wheels, of which the following is a specification.

The present invention relates to spring wheels of the type designed for use in connection especially with motor vehicles to replace the pneumatic tires now generally in use.

The main object of my invention resides in such an arrangement of springs wherein radially arranged springs and obliquely arranged springs are used, the arrangement of oblique springs being such that when the wheel has flexed or moved its limit of cushioning movement, each pair of obliquely arranged springs will be in substantial longitudinal alinement with each other.

I find it desirable to so arrange all the springs used by me that when the wheel flexes, those sustaining the load will be placed in compression. In so arranging them, I find it essential that they should be provided with some guiding means whereby the body portion of the spring will not buckle and I, therefore, provide what I have termed a telescoping connection between each pair of pivot members for each spring, this connection being such that the inner pivot member is guided in its movement toward the other one to thus prevent buckling or other improper movements of these springs.

The preferred embodiment of my invention is shown in the accompanying sheet of drawings, in which similar characters of reference designate corresponding parts, and in which:

Figure 1 is a vertical longitudinal section through a quarter section of my improved wheel, Fig. 2 is a transverse section through one section of my improved wheel, Fig. 3 is a detail view of one of the spring units used by me, this unit being partially shown in section and showing the spring completely expanded and the two pivot members moved apart their maximum distance, Fig. 4 is a view of the same unit shown in Fig. 3, but showing the spring in its full compression, Fig. 5 is a similar sectional view of the same unit, showing it in its normal position, Fig. 6 is a section taken on line 6—6 of Fig. 5, Fig. 7 is a top plan view of the detached spring, as shown in Fig. 4, Fig. 8 is a vertical sectional view of a modified form of spring unit, and Fig. 9 is a section taken on line 9—9 of Fig. 8.

The wheel shown in the drawings, has somewhat of the general appearance of the ordinary wheel now in use, it being provided with spokes 1 radiating from any preferred type of hub, not shown, and a felly 2. Securely fastened to this felly by means of bolts shown at 3, is an annular channel-shaped element designated 4 to which one end of each of the springs used in my construction, is pivotally attached. Encircling the spoke and hub portion is the tread portion comprising the tires 5 suitably mounted upon a band 6 and held in clamped position by means of the circular side pieces 7 provided with clencher portions, as is shown at 8. These side pieces are also provided with annular beads 9 designed to carry any suitable type of packing in order that dust and dirt may be excluded from the interior working parts of the wheel as a whole. Angular reinforcing members 11 are provided for reinforcing the channel shaped tread portion and both of these angular members are provided with a plurality of depending ears such as shown at 12, these ears being designed to coöperate with similarly formed ears 13 carried by the U-shaped channel member 4. These projecting ears serve as a means for pivoting the opposite ends of the springs used in my construction.

From Figs. 1 and 2, it will be noted that the cushioning structure of my wheel comprises a plurality of sets of springs symmetrically arranged about the wheel and interposed between the spoke and tread portion. Each set comprises a pair of radially arranged springs designated 14, these two springs being located on opposite sides of the center plane of the wheel, as is shown. These radially arranged springs are supplemented by two pairs of supplemental springs 15, these supplemental springs being similarly arranged as regards the center plane of the wheel, as has been related in connection with the radial springs 14 and each disposed at such angle to each other that when the radial springs are compressed, the supplemental springs will be in substantially longitudinal alinement with each other. All of the springs are pivotally mounted at both ends, the pivotal mounting for the tread portion comprising a bolt 16 and the pivotal mounting on the hub and spoke portion comprising a rivet 17 countersunk on both ends, as is shown. Mounted on each of the bolts 16 and rivets 17 is a sleeve 18, this sleeve exactly fitting the space between the side pieces forming the channel of both the spoke and tread portions and being designed to loosely receive the pivot members shown at 19 and 20. These pivot members are slightly less in length than the sleeves 18 to at all times enable their free pivotal movement after the wheel has been assembled.

In order to prevent the buckling of the springs under compression, I have provided the pivot members 20 with an outstanding sleeve such as is shown at 21. This sleeve 21 is of a length slightly greater than half the distance between the pivot bolts 16 and 17 and is designed to coöperate with a stud 22 carried by the complemental pivot member 19. This stud is of a size to slidingly fit the interior of the sleeve 21 and is of a length that the two members 19 and 20 will always be in engagement with each other. The base portion of the stud 22 is provided with an enlargement as is shown at 23, this enlargement being of a size to fit the interior of the spring, as is shown to form a stud and is likewise provided with a bayonet slot as is shown at 24. This end of the spring is provided with an inturned portion 25, this inturned portion fitting in the bayonet slot as is shown and in order to establish a rigid connection between the spring and this pivot member, the projecting tongue 26 formed by this bayonet slot is given a blow with a hammer or the like to distort it, as is shown. In this manner this end of the spring is rigidly held in position on its respective pivot member, while the opposite end is free of any rigid connection as is clearly shown, in Fig. 3.

From the foregoing description, taken in connection with the drawings thus far described, it will be noted that I have provided a wheel which is positive in its operation. The springs 14 and 15 are placed in the wheel in their normal state, by which I mean free of compression or free of tension. The arrangement as regards the obliquely arranged springs is such that a toggle action is provided for the set of these springs in vertical alinement with the axle, since these springs are so mounted that when the radial springs are fully compressed, the supplemental or oblique springs will be in substantial longitudinal alinement with each other. This causes a slight compression of the supplemental springs, as well as a complete compression of the radial springs 14. In the meantime the set of springs on the upper half of the wheel in vertical alinement with the axle, will offer no resistance whatever inasmuch as one end of each spring is free of rigid connection with its corresponding pivot member 20. The rigid connection on to the other pivot member 19 is provided in order to avoid all rattle etc., as the vehicle to which the wheel is applied moves along. By means of the telescoping joint formed between the sleeve 21 and the stud 22, the springs may be freely compressed at any time without causing their buckling as would be the case where this telescoping connection was not used.

The telescoping connection just referred to, has also been shown in slightly modified form in Fig. 9, in which the sleeve 27 corresponds with the sleeve 21, but is somewhat larger in diameter to encircle the outside of the springs, as is shown. The stud 28 carried by the pivot member 19 corresponds to the stud 22, but this stud is also slightly larger in diameter to snugly fit the interior of the spring. In this sense, a telescoping connection has also been provided, but the two projections on the pivot members 18 and 19 are caused to engage and rub over the inner and outer surfaces of the springs instead of telescoping directly into each other as is shown in Fig. 5. The stud 28 is also provided with a bayonet slot such as is shown at 29, into which the inturned end of the spring is caused to fit and a pin 30 is then placed in the position shown to securely hold the spring in position.

What I claim, is:

1. A spring wheel comprising a hub and spoke portion, a tread portion, and a plurality of sets of springs symmetrically arranged and interposed between said spoke and tread portions, each set comprising a radially extending spring and a supplemental spring on each side of and arranged to extend obliquely to said first-named spring, the supplemental springs of each set on opposite sides of their respective radial springs being disposed at such angle to each other that when the radial springs are fully compressed, the supplemental springs of each set will be in substantial longitudinal alinement with each other, all of said springs being pivotally mounted at one end to said spoke portion and to said tread portion at their opposite ends.

2. A spring wheel comprising a hub and spoke portion, a tread portion, and a plurality of sets of springs symmetrically arranged and interposed between said spoke and tread portions, each set comprising a pair of radially extending springs arranged side by side and equally spaced on opposite sides of the center portion of the wheel, and a pair of similarly located supplemental springs on each side of and extending obliquely to said first named springs, the supplemental springs on opposite sides of said radial springs being disposed at such angle to each other that when the radial springs are fully compressed the supplemental springs will be in substantial longitudinal alinement with each other, all of said springs being pivotally mounted at one end to said spoke portion and to said tread portion at their opposite ends.

3. A spring wheel comprising a hub and spoke portion, a tread portion, and a plurality of sets of springs symmetrically arranged and interposed between said spoke and tread portions, each set comprising a pair of radially extending springs arranged side by side and equally spaced on opposite sides of the center plane of the wheel, and a pair of similarly located supplemental springs on each side of and extending obliquely to said first named springs, the supplemental springs of each set on opposite sides of their respective radial springs being disposed at such angle to each other that when the radial springs are fully compressed, the supplemental springs will be in substantial longitudinal alinement with each other, cross pins for each end for each pair of springs, certain of which extend transversely across said spoke portion and the remainder of which extend transversely across said tread portion, a sleeve on each of said pins, a pivoted member pivotally mounted on each sleeve, said members being shorter than said sleeves, and centering studs on said members arranged to seat themselves in the spring ends.

4. A spring wheel comprising a hub and spoke portion, a tread portion, a plurality of springs interposed between said hub and spoke portions, pivot members carried by each of said spoke and tread portions and arranged to coöperate with opposite ends of said springs, means carried by each of said members for holding the spring ends central on their respective pivot members, one member of each pair of members being formed with a bayonet slot, and an inturned end on each spring adapted to fit in said slot, the other spring ends being free of rigid connection with their pivot members.

In testimony whereof I affix my signature in presence of two witnesses.

FREEMAN R. WILLSON.

Witnesses:
   WALTER E. L. BOCK,
   A. L. PHELPS.